March 9, 1926.
O. O. POTTER ET AL
1,576,217
COTTON STALK CUTTER
Filed Sept. 23, 1924
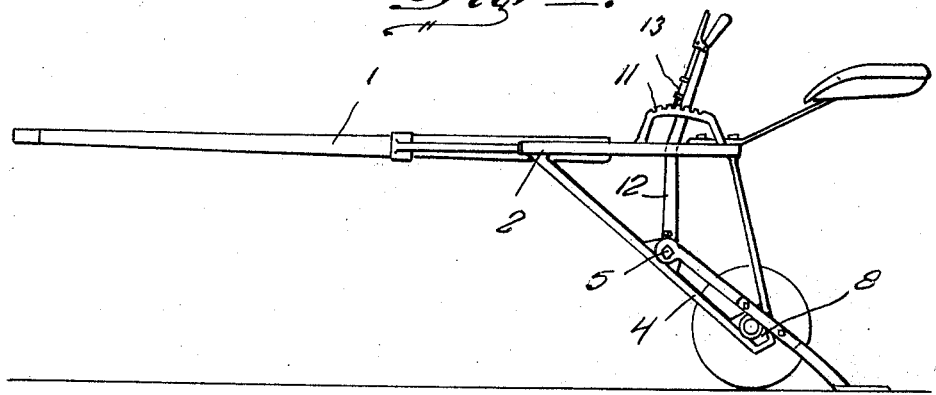
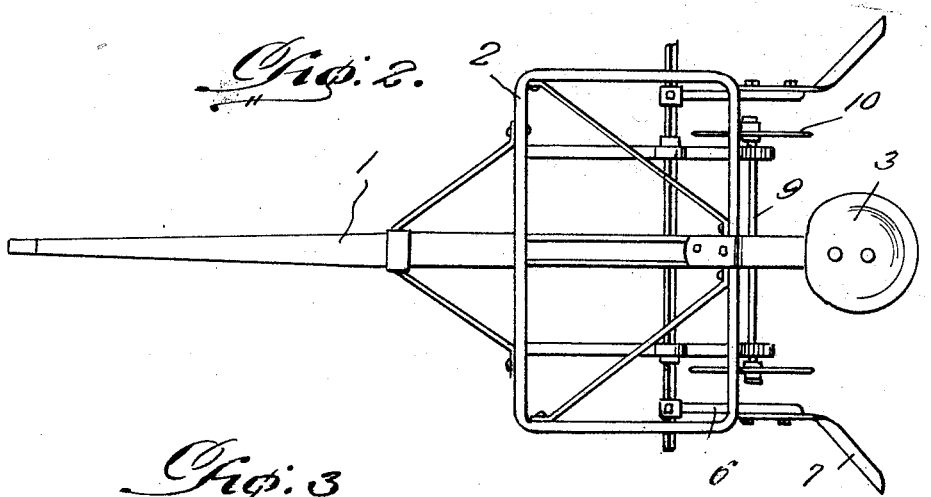
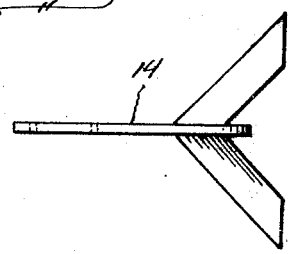
Oren Oliver Potter and
Samuel William Potter,
Inventors
By Clarence A. O'Brien
Attorney Patented Mar. 9, 1926.

1,576,217

UNITED STATES PATENT OFFICE.

OREN OLIVER POTTER AND SAMUEL WILLIAM POTTER, OF WESLACO, TEXAS.

COTTON-STALK CUTTER.

Application filed September 23, 1924. Serial No. 739,357.

*To all whom it may concern:*

Be it known that we, OREN OLIVER POTTER and SAMUEL WILLIAM POTTER, citizens of the United States, residing at Weslaco, in the county of Hidalgo and State of Texas, have invented certain new and useful Improvements in Cotton-Stalk Cutters, of which the following is a specification.

This invention relates to cotton stalk cutters and it consists in the novel features hereinafter described and claimed.

An object of the invention is to provide a cotton stalk cutter which, if desired, may be provided with plow attachments, and which may be drawn by one or more draft animals, for the purpose of clearing the land of the cotton stalks, preparatory to planting.

In the accompanying drawing:

Figure 1 is a side elevational view of the cotton stalk cutter.

Figure 2 is a top plan view of the same.

Figure 3 is a detail plan view of a plow, which may be attached to the cotton stalk cutter.

As illustrated in the accompanying drawing, the cotton stalk cutter comprises the tongue 1, which is connected at its rear end with a rectangular frame 2.

A seat 3 is mounted at the rear portion of the frame 2. Brackets 4 depend from the intermediate portion of the frame 1, and the forward sides of the said bracket are downwardly and rearwardly inclined. The transversely disposed shaft 5 is journaled upon the forward, downwardly and rearwardly inclined sides of the bracket 4 and is disposed transversely under the frame 2. Arms 6 are mounted at spaced intervals upon the shaft 5, and cutter blades 7 are carried by the said arms. Journal bearings 8 are mounted in the lower portions of the bracket 4, and a shaft 9 is journaled in the said bearing. Discs 10 are mounted upon the end portions of the shaft 9. The dentate segment 11 is mounted at the rear portion of the frame 1, and a lever 12 is fixed to the intermediate portion of the shaft 5 and is provided with a latch 13 adapted to engage the teeth of the segment 11.

By shifting the lever 12, the shaft 5 may be turned, whereby the arms 6 and blades 7 may be properly positioned with relation to the surface of the ground. As the implement is drawn between two rows of standing stalks, the discs 10 cut into the soil and prevent side draft of the implement. At the same time, the blades 7 encounter the stalks at or about the surface of the soil and cut them down so that the stalks may be turned under at subsequent plowing.

If desired, a plow beam and plow 14, as shown in Figure 3 of the drawing may be connected with the shaft 5 and used for the purpose of opening a furrow with the implement.

Having described the invention, what is claimed is:

A cotton stalk cutter including a rectangular frame, a pair of brackets provided with downwardly and rearwardly inclined forward sides extending from the front side of the frame, and upwardly and forwardly inclined sides attached to the rear side of the frame, a shaft journaled intermediately of the downwardly and rearwardly inclined forward sides of the bracket, transversely under the frame, cutting blades carried by the shaft, means for actuating the shaft, so that the cutting blades may be disengaged from the ground, and a second shaft journaled at the bottom ends of the brackets, adjacent the junctures of the forward and rearward sides thereof, and spaced discs mounted upon the second mentioned shaft.

In testimony whereof we affix our signatures.

OREN OLIVER POTTER.
SAMUEL WILLIAM POTTER.